United States Patent
Boloorian et al.

(10) Patent No.: US 11,385,353 B2
(45) Date of Patent: Jul. 12, 2022

(54) USE OF FREQUENCY OFFSETS IN GENERATION OF LIDAR DATA

(71) Applicant: SiLC Technologies, Inc., Monrovia, CA (US)

(72) Inventors: Majid Boloorian, San Diego, CA (US); Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 583 days.

(21) Appl. No.: 16/526,941

(22) Filed: Jul. 30, 2019

(65) Prior Publication Data

US 2021/0033732 A1    Feb. 4, 2021

(51) Int. Cl.
| | | |
|---|---|---|
| *G01C 3/08* | (2006.01) | |
| *G01S 17/88* | (2006.01) | |
| *G01S 17/34* | (2020.01) | |
| *G01S 7/48* | (2006.01) | |

(52) U.S. Cl.
CPC .............. *G01S 17/88* (2013.01); *G01S 17/34* (2020.01); *G01S 7/4808* (2013.01)

(58) Field of Classification Search
None
See application file for complete search history.

(56) References Cited

U.S. PATENT DOCUMENTS

| | | | | |
|---|---|---|---|---|
| 2020/0209366 A1* | 7/2020 | Maleki | ................. | G01S 7/4911 |
| 2020/0309952 A1* | 10/2020 | Imaki | ................... | G01S 7/4911 |

FOREIGN PATENT DOCUMENTS

| | | | | |
|---|---|---|---|---|
| WO | WO 2018116412 A1 * | 6/2018 | ........... | G01S 17/486 |
| WO | WO 2019130472 A1 * | 7/2019 | ............. | G01S 17/58 |
| WO | WO 2020129284 A1 * | 2/2020 | ............. | G01S 17/34 |

* cited by examiner

*Primary Examiner* — Mark Hellner
(74) *Attorney, Agent, or Firm* — Gavrilovich, Dodd & Lindsey LLP

(57) ABSTRACT

A LIDAR system that generates an outgoing LIDAR signal and multiple composite light signals that each carries a different channel and that each includes a contribution from a reference signal and a contribution from a comparative signal. The comparative signals each include light from the outgoing LIDAR signal that has been reflected by one or more objects located outside of the LIDAR system. The reference signals each include light from the outgoing LIDAR signal but exclude light that has been reflected by any object located outside of the LIDAR system. Electronics induce a frequency offset in the reference signals between a LIDAR data period and a channel period. The electronics use the composite signals generated during the LIDAR data period to generate LIDAR data and the composite signals generated during the channel period to associate the composite signals with the channel carried by the composite signal.

9 Claims, 6 Drawing Sheets

USE OF FREQUENCY OFFSETS IN GENERATION OF LIDAR DATA

FIELD

The invention relates to optical devices. In particular, the invention relates to LIDAR systems.

BACKGROUND

LIDAR technologies are being applied to a variety of applications. LIDAR specifications typically specify that LIDAR data be generated for a minimum number of sample regions in a field of view. LIDAR specifications also specify the distance of those sample regions from the LIDAR signal source and a re-fresh rate. The re-fresh rate is the frequency at which the LIDAR data is generated for all of the sample regions in the field of view. The ability of the given LIDAR system to generate the LIDAR data for the sample regions in the field of view becomes more difficult as the distance to the sample regions increases and as the refresh rate increases.

As LIDAR is being adapted to applications such as self-driving-vehicles, it becomes more desirable to generate LIDAR data for larger fields of view, increasing numbers of points, further distances, and at faster re-fresh rates. As a result, there is a need for a LIDAR system that capable of generating LIDAR data for larger numbers of sample regions.

SUMMARY

A LIDAR system that generates an outgoing LIDAR signal and multiple composite light signals that each carries a different channel and that each includes a contribution from a reference signal and a contribution from a comparative signal. The comparative signals each include light from the outgoing LIDAR signal that has been reflected by one or more objects located outside of the LIDAR system. The reference signals each include light from the outgoing LIDAR signal but exclude light that has been reflected by any object located outside of the LIDAR system. Electronics induce a frequency offset in the reference signals between a LIDAR data period and a channel period. The electronics use the composite signals generated during the LIDAR data period to generate LIDAR data and the composite signals generated during the channel period to associate the composite signals with the channel carried by the composite signal.

BRIEF DESCRIPTION OF THE FIGURES

FIG. 3A is a schematic of the processing unit.

FIG. 3B illustrates the relationship between the frequencies associated with different channels in a data signal processed by the schematic of FIG. 3A.

FIG. 3C illustrates a schematic for an example of electronics that are suitable for use with a processing unit constructed according to FIG. 3A.

DESCRIPTION

The LIDAR system generates an outgoing light signal that includes multiple channels that are each of a different wavelength. The different channels are directed to the same sample region in a field of view or to different sample regions in the field of view and LIDAR data (distance and/or radial velocity between the source of a LIDAR output signal and a reflecting object) is generated for each of the sample regions. The concurrent use of multiple different channels to generate LIDAR data accelerates the generation of LIDAR data for a field of view and accordingly allows the LIDAR specifications to be satisfied for applications that require larger fields of view, increased numbers of sample regions, further field of view distances, and lower re-fresh rates.

The LIDAR system also generate multiple composite light signals that each carries a different one of the channels and each includes a contribution from a reference signal and a contribution from a comparative signal. The comparative signals each include light from the outgoing LIDAR signal that has been reflected by one or more objects located outside of the LIDAR system. The reference signals also include light from the outgoing LIDAR signal but also exclude any light that has been reflected by any object located outside of the LIDAR system.

The period of time that the one or more channels are direction to the sample regions includes a LIDAR data period and a channel period. During the data period and the channel period, there is a constant frequency differential between a frequency of the reference signal and a frequency of the associated comparative signal. However, electronics induce a frequency offset into the comparative signal between the LIDAR data period and the channel period. The frequency offset causes the value of the frequency differential to be different in the LIDAR data period and the channel period. The different frequency differentials can be used to identify the channel being carried by the different composite signals and then use that result to calculate the LIDAR data.

Prior efforts to create the frequency offset have used a different light source for the reference signal and the comparative signal. However, the disclosed LIDAR system creates the frequency offset using reference signals and comparative signals from the same light source. As a result, the disclosed LIDAR system reduces the number of light sources that are required and accordingly reduces the number of light sources that are needed.

Figure 1A:
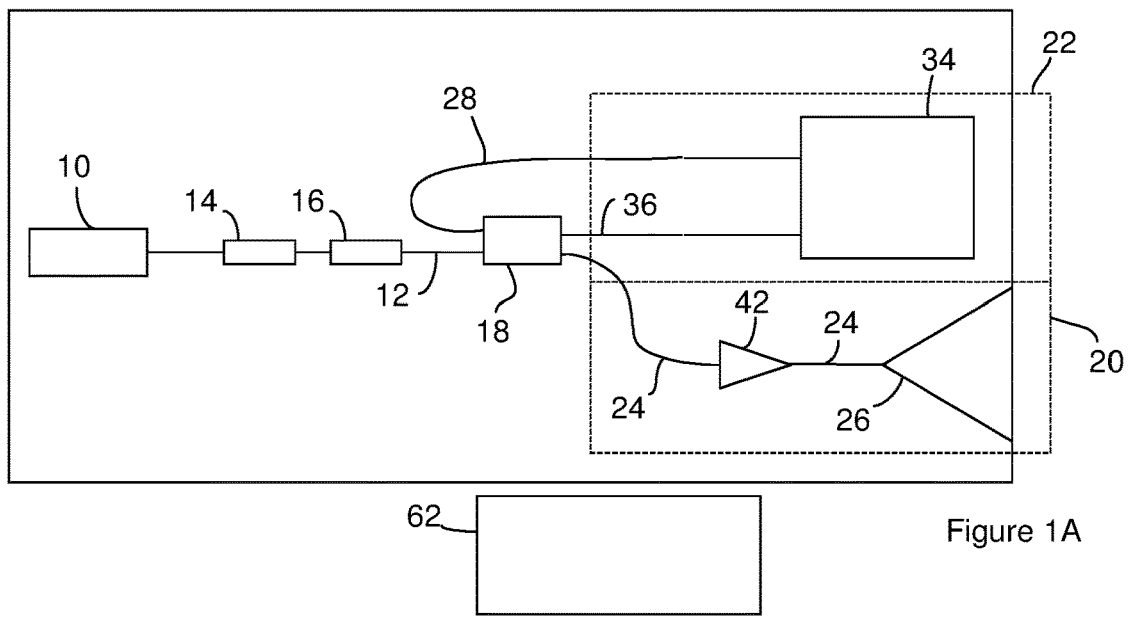
FIG. 1A is a schematic of a LIDAR system.

FIG. 1A is a schematic of a LIDAR system. The system includes a light source 10 such as a laser that outputs an outgoing LIDAR signal. The outgoing LIDAR signal carries one or more channels. When the outgoing LIDAR signal carries multiple different channels, the different channels can each be at a different wavelength. In some instances, the wavelengths of the channels are periodically spaced in that the wavelength increase from one channel to the next channel is constant or substantially constant. A suitable light source 10 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov.

30, 2017, grated U.S. Pat. No. 7,542,641, entitled "Multi-Channel Optical Device," and incorporated herein in its entirety.

The LIDAR system also includes a utility waveguide 12 that receives an outgoing LIDAR signal from the light source 10. A modulator 14 is optionally positioned along the utility waveguide 12. The modulator 14 can be configured to modulate the power of the outgoing LIDAR signal and accordingly the resulting LIDAR output signal(s). Electronics 62 can operate the modulator 14. Accordingly, the electronics can modulate the power of the outgoing LIDAR signal and accordingly the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. Ser. No. 617,810, now U.S. Pat. No. 5,757,986, filed on Sep. 21, 1993, entitled Integrated Silicon PIN Diode Electro-Optic Waveguide, and incorporated herein in its entirety.

An amplifier 16 is optionally positioned along the utility waveguide 12. Since the power of the outgoing LIDAR signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing LIDAR signal from the modulator 14 to a signal-directing component 18. The signal-directing component 18 can direct the outgoing LIDAR signal to a LIDAR branch 20 and/or a data branch 22. The LIDAR branch outputs one or more LIDAR output signals from the LIDAR chip and receives LIDAR input signals that result from reflection of the one or more LIDAR output signals. The data branch processes the LIDAR input signals for the generation of LIDAR data (distance and/or radial velocity between the source of the LIDAR output signal and a reflecting object).

The LIDAR branch includes a LIDAR signal waveguide 24 that receives at least a portion of the outgoing LIDAR signal from the signal-directing component 18. An output component 26 receives the outgoing LIDAR signal from the LIDAR signal waveguide 24 and outputs the outgoing LIDAR signal such that the outgoing LIDAR signal exits from the LIDAR chip. The outgoing LIDAR signal exit from the LIDAR chip as one or more LIDAR output signals that travel through the atmosphere in which the LIDAR system is positioned. Each of the LIDAR output signals carries one of the channels carried in the outgoing LIDAR signal.

The LIDAR output signals can be reflected by a reflecting object (not shown) located outside of the LIDAR system. Each of the reflected LIDAR output signals travel through the atmosphere in which the LIDAR system is positioned and returns to the output component 26 as a LIDAR input signal. The output component 26 receives the LIDAR input signals and outputs the result on the LIDAR signal waveguide 24 as an incoming LIDAR signal.

When the outgoing LIDAR signal includes multiple different channels at different wavelengths, the output component 26 can be configured such that the LIDAR output signals carrying different channels are incident on the same sample region in the field of view or such that the LIDAR output signals carrying different channels are incident on different sample regions in the field of view. For instance, the output component 26 can be configured that the LIDAR output signals carrying different channel travels away from the LIDAR chip in different directions or such that LIDAR output signals carrying different channels travel away from the LIDAR chip in the same direction or in substantially in the same direction and at least partially overlap one another at the maximum distance at which the LIDAR system is configured to generate LIDAR data.

In some instances, the output component 26 also includes beam steering functionality. In these instances, the output component 26 can be in electrical communication with electronics (not shown) that can operate the output component 26 so as to steer the LIDAR output signals from one of the sample regions in a field of view to other sample regions in the field of view. The output component 26 and/or electronics can be configured such that the different LIDAR output signals are steered concurrently.

Although the output component 26 is illustrated as a single component, the output component 26 can include multiple optical components and/or electrical components. Suitable output components 26 include, but are not limited to, optical phased arrays (OPAs), transmission diffraction gratings, reflection diffraction gratings, and Diffractive Optical Elements (DOE). Suitable output components 26 with beam steering capability include, but are not limited to, optical phased arrays (OPAs) with active phase control elements on the array waveguides.

The LIDAR signal waveguide 24 carries the incoming LIDAR signal to the signal-directing component 18. The signal-directing component 18 directs the incoming LIDAR signal to the utility waveguide 12 and/or a comparative signal waveguide 28. The portion of the incoming LIDAR signal-directed to the comparative signal waveguide 28 serves a comparative signal. The comparative signal waveguide 28 carries the comparative signal to the processing component 34.

The signal-directing component 18 is configured such that when the signal-directing component 18 directs at least a portion of the incoming LIDAR signal to the comparative signal waveguide 28, the signal-directing component 18 also directs at least a portion of the outgoing LIDAR signal to a reference signal waveguide 36. The portion of the outgoing LIDAR signal received by the reference signal waveguide 36 serves as a reference signal. The reference signal waveguide 36 carries the reference signal to the processing component 34.

As will be described in more detail below, the processing component 34 combines the comparative signal with the reference signal to form a composite signal that carries LIDAR data for one or more sample regions in the field of view. Accordingly, the composite signal can be processed so as to extract LIDAR data for one or more sample regions in the field of view.

The signal-directing component 18 can be an optical coupler. When the signal-directing component 18 is an optical coupler, the signal-directing component 18 directs a first portion of the outgoing LIDAR signal to the LIDAR signal waveguide 24 and a second portion of the outgoing LIDAR signal to the reference signal waveguide 36 and also directs a first portion of the incoming LIDAR signal to the utility waveguide 12 and a second portion of the incoming LIDAR signal to the comparative signal waveguide 28. Accordingly, the second portion of the incoming LIDAR signal can serve as the comparative signal and the second portion of the outgoing LIDAR signal can serve as the reference.

The signal-directing component 18 can be an optical switch such as a cross-over switch. A suitable cross-over switch can be operated in a cross mode or a pass mode. In the pass mode, the outgoing LIDAR signal is directed to the LIDAR signal waveguide 24 and an incoming LIDAR signal would be directed to the utility waveguide 12. In the cross mode, the outgoing LIDAR signal is directed to the reference signal waveguide 36 and the incoming LIDAR signal is directed to the comparative signal waveguide 28. Accordingly, the incoming LIDAR signal or a portion of the incoming LIDAR signal can serve as the comparative light signal and the outgoing LIDAR signal or a portion of the outgoing LIDAR signal can serve as the reference light signal.

An optical switch such as a cross-over switch can be controlled by the electronics. For instance, the electronics can control operate the switch such that the switch is in the cross mode or a pass mode. When LIDAR output signals are to be transmitted from the LIDAR system, the electronics operate the switch such that the switch is in the pass mode. When LIDAR input signals are to be received by the LIDAR system, the electronics operate the switch such that the switch is in the cross-over mode. In an embodiment disclosed below, the electronics operate the switch in the pass mode during an output period and operate the switch in the crossover mode during the feedback period. As a result, the composite signals and/or the reference signals are not generated during at least a portion of the output period and/or the LIDAR output signals are not generated during at least a portion of the feedback period. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch. As a result, the processing component 34 can combine the comparative signal with the reference signal.

In some instances, an optical amplifier 42 is optionally positioned along the LIDAR signal waveguide 24 and is configured to provide amplification of the outgoing LIDAR signal and/or of the incoming LIDAR signal. Accordingly, the effects of optical loss at the signal-directing component 18 can be reduced.

Figure 1B:
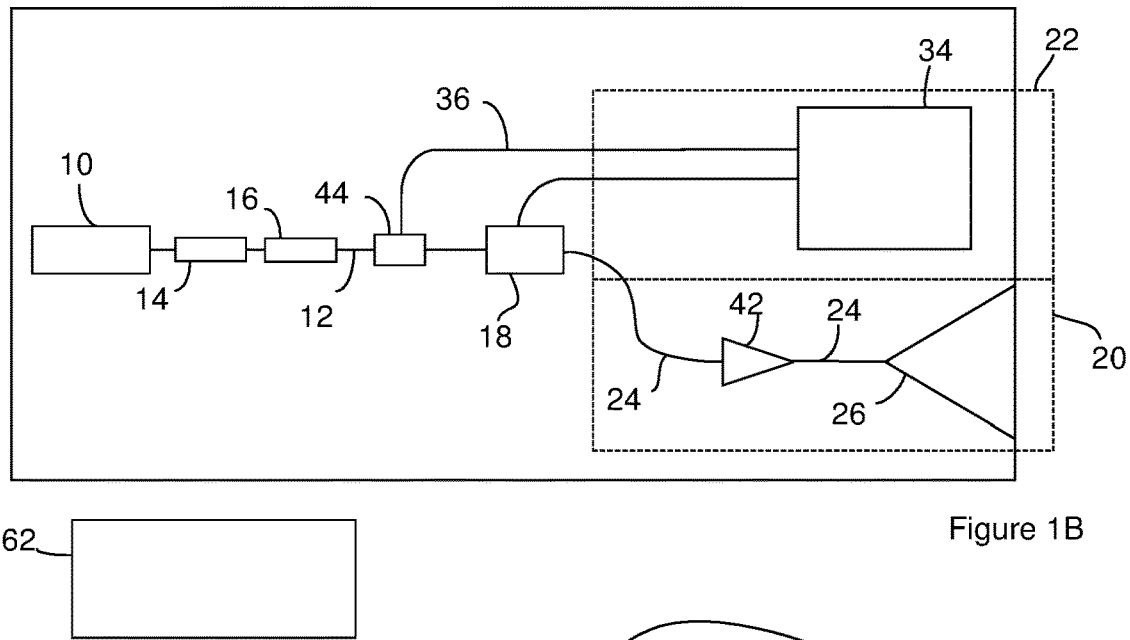
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing LIDAR signal is directed to the LIDAR signal waveguide 24 and the incoming LIDAR signal is directed to the comparative signal waveguide 28. The comparative signal waveguide 28 carries the comparative signal to the processing component 34. Additionally, a tap component 44 is positioned along the utility waveguide 12. The tap component 44 is configured to tap off a first portion of the outgoing LIDAR signal such that the first portion of the outgoing LIDAR signal is received on the reference signal waveguide 36. The first portion of the outgoing LIDAR signal received by the reference signal waveguide 36 serves as the reference signal. The reference signal waveguide 36 carries the reference signal to the processing component 34. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Figure 2A:
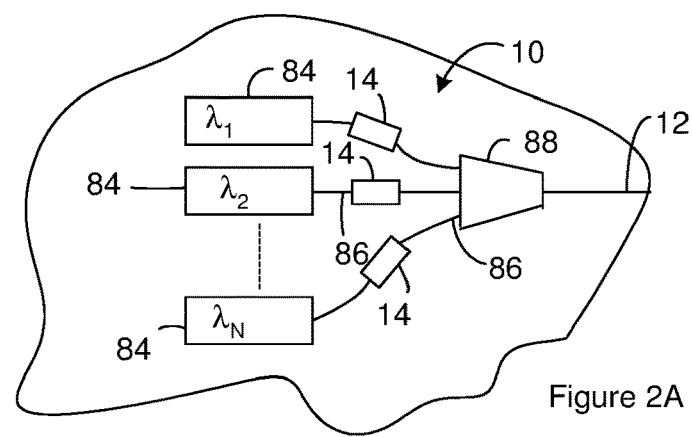
FIG. 2A illustrates a light source that includes multiple laser sources.

As noted above, one or more of the light sources 10 can be a comb laser. However, other constructions of the light source 10 are possible. For instance, FIG. 2A illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the channels on a source waveguide 86. The total number of laser sources 84 included in the light source 10 can be greater than or equal to the number of LIDAR output signals that are concurrently directed to a sample region. In some instances, total number of laser sources 84 included in the light source 10 is equal to the number of LIDAR output signals that are concurrently directed to a sample region. As a result, each laser sources 84 can be the source of a different one of the LIDAR output signals that are concurrently directed to a sample region.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the LIDAR output signals, the electronics can operate the laser sources 84 so different LIDAR output signals have different frequency versus time waveforms.

A modulator 14 can optionally be positioned along one or more of the source waveguides 86. The modulator 14 can each be configured to modulate the power of one of the channels and accordingly the amplitude of the resulting LIDAR output signal(s). The electronics can operate the modulator 14. Accordingly, the electronics can modulate the power of the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. Ser. No. 617,810, filed on Sep. 21, 1993, entitled Integrated Silicon PIN Diode Electro-Optic Waveguide, and incorporated herein in its entirety.

The electronics can operate the modulators and/or the laser sources 84 so as to provide different LIDAR output signals with different waveforms. For instance, the electronics can operate one or more laser sources 84 to each produce a LIDAR output signal with a frequency that is not a function of time and an amplitude that is not a function of time such as a continuous wave. Additionally or alternately, the electronics can operate one or more laser sources 84 and associated modulator(s) 14 so as to generate one or more LIDAR output signals that has an amplitude that is a function of time. Additionally or alternately, the electronics can operate one or more laser sources 84 and associated modulator(s) 14 so as to generate a LIDAR output signal with a frequency that is a function of time. Additionally or alternately, the electronics can operate one or more laser sources 84 and associated modulator(s) 14 so as to generate a LIDAR output signal with a frequency that is a function of time and an amplitude that is a function of time.

During operation of the LIDAR system, the generation of LIDAR data is divided into a series of cycles where LIDAR data is generated for each cycle. Each LIDAR data result can be associated with a sample region in the field of view in that the resulting LIDAR data is the LIDAR data for one or more object located in that sample region. For instance, when multiple LIDAR output signals are directed to the same sample region in a field of view, one or more LIDAR data results can be generated from each one of all or a portion of the multiple LIDAR output signals during that cycle and each of the LIDAR data results can be LIDAR data for an object in that sample region. When multiple LIDAR output signals are directed to different sample regions in a field of view, one or more LIDAR data results can be generated from each one of all or a portion of the multiple LIDAR output signals during that cycle and all or a portion of the LIDAR data results can be for an object located in a different sample region in the field of view. In some instances, the one or more LIDAR output signals are directed to different sample regions in different cycles. As a result, the LIDAR data generated during different cycles is generated for different selections of the sample regions until generation of the LIDAR data for the field of view is complete and the LIDAR system repeats the process of generating LIDAR data for the field of view. When the LIDAR system repeatedly generates LIDAR data for the field of view, the LIDAR system can return the one or more LIDAR output signals to the same sample regions for which LIDAR data was previously generated.

The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signal is moved continuously. In one example, the cycles include multiple data periods and multiple different LIDAR output signals each caries a different channel to the same sample region. In another example, the cycles include multiple data periods and multiple different LIDAR output signals each caries a different channel to the same sample region.

Figure 2B:
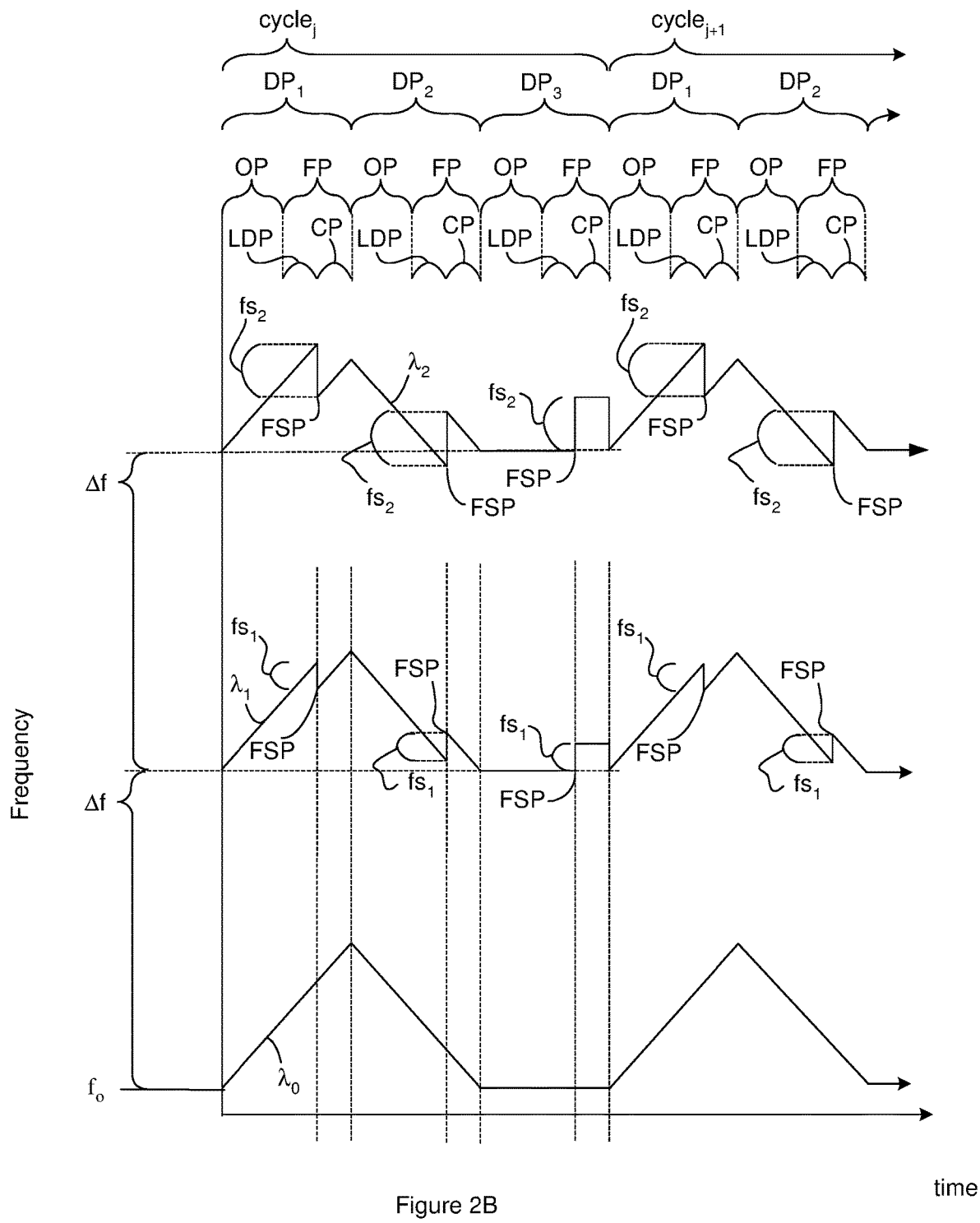
FIG. 2B illustrates the frequencies of LIDAR output signals that carry different channels as a function of time.

FIG. 2B shows an example of a relationship between the frequency of multiple different LIDAR output signals, time, cycles and the data periods. The LIDAR output signals are each associated with a channel index i that starts at 0 and goes to N where N+1 is the number of LIDAR output signals. Different LIDAR output signals are labeled $\lambda_i$ in FIG. 2B. The base frequency of each LIDAR output signal ($bf_i$) can be the frequency of the LIDAR output signal at the start of a cycle and can be: $bf_i=f_o+i*\Delta f$ where $f_o$ represents the frequency of channel i=0 at the start of a cycle. Accordingly, the base frequencies can be linearly spaced. Although FIG. 2B shows the frequencies of three LIDAR output signals labeled $\lambda_o$, $\lambda_1$ and $\lambda_2$; the LIDAR system can output only one LIDAR output signal or more than three output signals.

FIG. 2B shows frequency versus time for a sequence of two cycles labeled $cycle_j$ and $cycle_{j+1}$. In some instances, the frequency versus time pattern is repeated in each cycle as shown in FIG. 2B. The illustrated cycles do not include re-location periods and/or re-location periods are not located between cycles. As a result, FIG. 2B illustrates the results for a continuous scan.

Each cycle includes K data periods that are each associated with a period index k and are labeled $DP_k$. In the example of FIG. 2B, each cycle includes three data periods labeled $DP_k$ with k=1, 2, and 3. In some instances, the frequency versus time pattern is the same for the data periods that correspond to each other in different cycles as is shown in FIG. 2B. Corresponding data periods are data periods with the same period index. As a result, each data period $DP_1$ can be considered corresponding data periods and the associated frequency versus time patterns are the same in FIG. 2B. At the end of a cycle, the electronics return the frequency of each channel to the same frequency level at which it started the previous cycle. For instance, in FIG. 2B, the electronics return the frequency of channel i to $f_o+i*\Delta f$ to start each cycle.

Each data period includes an output period labeled OP and a feedback period labeled FP. As will be discussed in more detail below, the feedback periods include a LIDAR data period labeled LDP and a channel period labeled CP. Although the LIDAR data period is shown before the channel period, the channel period can be located before the data period. During the output period, the frequency changes at a linear rate α. During the LIDAR data period (LDP), the channel period (CP), and the output period (OP) in the same data period, the rate of frequency change α is the same. The rate of change can be different for different channels and/or for different data periods.

For a portion of the channels or for all of the channels, all or a portion of the feedback periods included in each cycle, the LIDAR outputs signals are generated such that a frequency offset occurs between the LIDAR data period (LDP) and the channel period (CP) from the same data period. For instance, in FIG. 2B and FIG. 2C, the frequency offset occurs during an offset period labeled FSP in FIG. 2B and FIG. 2C. During the offset period, the frequency of the LIDAR output signal and the associated reference signal changes by an amount of the frequency offset labeled $fs_i$. In FIG. 2B, the channel $\lambda_0$ does not have a frequency offset between the LIDAR data periods (LDP) and the channel periods (CP) while the channel $\lambda_1$ has a frequency offset $fs_1$ between the LIDAR data periods (LDP) and the channel periods (CP) and the channel $\lambda_2$ has a frequency offset $fs_2$ between the LIDAR data periods (LDP) and the channel periods (CP).

The frequency offsets for different channels can be different. For instance, the change in the frequency offset between channels that are adjacent to one another on the wavelength spectrum can be separated by a constant. In one example, $fs_i=W+i*(df)$ where W is a constant that can be zero or non-zero and df is a constant that represents the change in the frequency offset for channels that are adjacent to one another on the wavelength spectrum. The value of df can be positive or negative. In one example, the frequency offsets for different channels are different and one of the frequency offsets is zero for one of the channels. In another example, the frequency offsets for different channels are different and none of the channels has a frequency offset that is zero.

The direction of the frequency offsets can be different in different data periods. For instance, the direction of the frequency offset for a data period with an increasing frequency can be negative for each of the channels as shown for the data period labeled $DP_1$ in FIG. 2B; the direction of the frequency offset for a data period with an decreasing frequency can be positive for each of the channels as shown for the data period labeled $DP_2$ in FIG. 2B; the direction of the frequency offset for a data period with an constant frequency can be positive for each of the channels as shown for the data period labeled $DP_2$ in FIG. 2B.

Figure 2C:
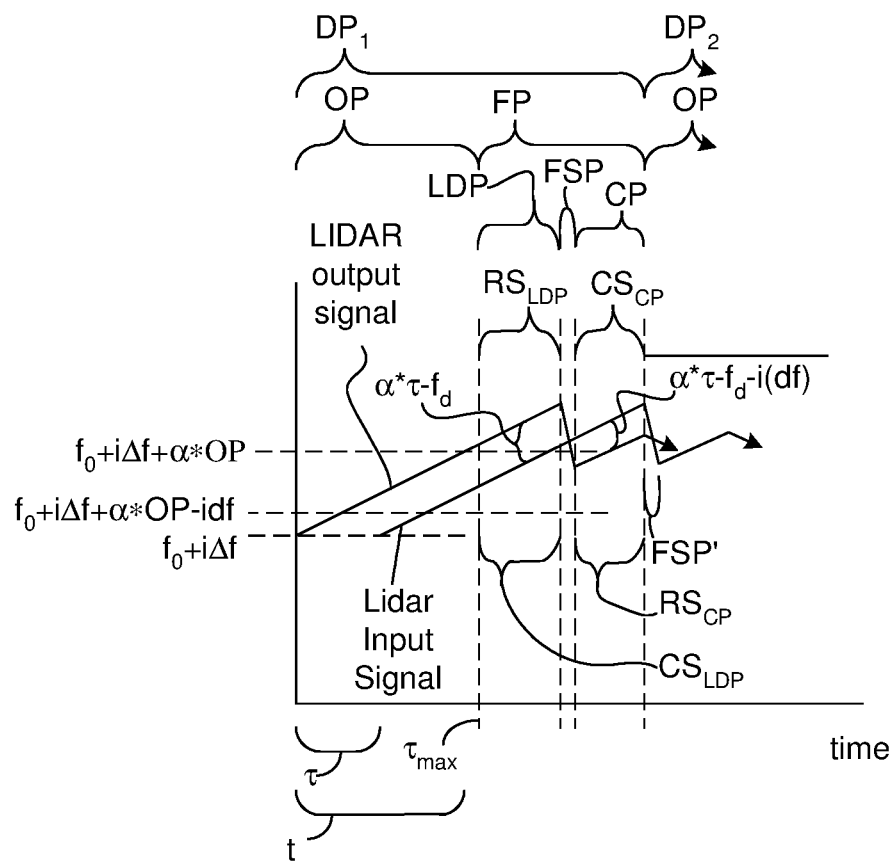
FIG. 2C illustrates an example of different light signals that can results from the LIDAR output signal of FIG. 2B.

FIG. 2C is a graph of frequency versus time showing the relationship between a LIDAR output signal and one possible resulting LIDAR input signal during the data period labeled $DP_1$ in FIG. 2B. During the output period and during the LIDAR data period (LDP), the frequency of the LIDAR output signal can be represented by Equation 1: $f_i=f_o+i*\Delta f+\alpha*t$ where $\alpha$ represents that rate of frequency change and t represents time and is equal to zero at the start of the output period. During the channel period (CP), the frequency of the LIDAR output signal can be represented by Equation 2: $f_i=f_o+i*\Delta f+\alpha*OP+fs_i+\alpha*t'$ where $\alpha$ represents the rate of frequency change, OP represents the duration of the output period and t' represents a time that is equal to zero at the start of the channel period (CP).

FIG. 2C also shows an example of a LIDAR input signals that can result from the illustrated LIDAR output signal. As described above, the LIDAR output signal travels away from the LIDAR chip and is reflected by an object located off of the LIDAR system. The reflected LIDAR output signal returns to the LIDAR system as the LIDAR input signal in FIG. 2C. The roundtrip time between the output of the LIDAR output signal and the receipt of the LIDAR input signal is labeled $\tau$ in FIG. 2C. The maximum roundtrip time for which the LIDAR system is configured to generate reliable LIDAR data is labeled $\tau_{max}$ in FIG. 2C. Although the LIDAR input signal shown in FIG. 2C is shown as starting its return to the LIDAR system at the time labeled $\tau$, the LIDAR input signal can return to the LIDAR system with any roundtrip time greater than or equal to zero and up to $\tau_{max}$. As a result, the illustrated LIDAR input signal is only one example of many possible LIDAR input signals.

As will become evident below, the LIDAR data is generated from the one or more LIDAR input signals and the one or more reference signals that occur during the feedback period. As a result, the LIDAR system can be constructed such that $\tau \leq \tau_{max} \leq OP$. In this configuration, any LIDAR output signals that experience the longest desirable roundtrip time ($\tau_{max}$) will begin returning to the LIDAR system before or at the start of the feedback period. Since $\tau_{max} \leq OP$, LIDAR input signals with a roundtrip time of $\tau_{max}$ will be returning to the LIDAR system during the feedback period. As a result, LIDAR data can be generated for these signals. In some instances, $\tau_{max}=OP$ as shown in FIG. 2B.

The LIDAR input signal includes an input offset period labeled FSP' in FIG. 2C. The input offset period (FSP') is where the frequency offset that occurs in the LIDAR output signal occurs in the returning LIDAR input signal. As a result, the duration of the input offset period (FSP')=the duration of the offset period (FSP) and can accordingly be zero. The location of the input offset period in time is a function of the roundtrip time and can accordingly shift left and right in FIG. 2C. The LIDAR system can be used in configurations where the roundtrip time $\tau$ is generally or always such that the input offset period (FSP') occurs after the feedback period (FP) and/or after the channel period (CP) as shown in FIG. 2C. For instance, the LIDAR system can be used in configurations where the roundtrip time $\tau$ is generally or always such that (CP+FSP)$\leq \tau$. In instances where FSP is zero, effectively zero, or can be approximated as zero, the LIDAR system can be used in configurations where the roundtrip time $\tau$ is generally or always such that (CP)$\leq \tau$. As will be evident below, in this configuration, the input offset period (FSP') does not interfere with the comparative signals generate during the feedback period. As a result, the LIDAR system can be used in configurations where the roundtrip time $\tau$ is generally or always such that (CP+FSP)$\leq \tau \leq \tau_{max} \leq OP$ and/or (CP)$\leq \tau \leq \tau_{max} \leq OP$.

As will become evident below, the LIDAR data is generated from the one or more LIDAR input signals (comparative signals) and the one or more reference signals that occur during the LIDAR data period. However, because the LIDAR system can concurrently output multiple LIDAR output signals that each carries a different channel, it can be unclear which signals belong to which channels. The comparative signals and the one or more reference signals that occur during the channel period (CP) are employed to match particular channels with particular signals and/or match signals associated with the same channel. As will become evident below, matching particular channels with particular signals and/or matching signals associated with the same channel can also use the comparative signals and the one or more reference signals that occur during the LIDAR data period.

Light from the LIDAR output signal(s) that are output during the output period becomes the LIDAR input signals during the feedback period and accordingly becomes the comparative light signals during the feedback period. The portion of LIDAR input signals received during the LIDAR data period represents the comparative light signals during the LIDAR data period. As a result, the portion of the LIDAR input signal received during the LIDAR data period is labeled $CS_{LDP}$. The portion of LIDAR input signals received during the channel period represents the comparative light signals during the channel period. As a result, the portion of the LIDAR input signal received during the channel period is labeled $CS_{CP}$.

As discussed above, the light in the LIDAR output signal(s) comes from an outgoing LIDAR signal that is also the source of the light for the reference signals. The reference signals that occur during the feedback period are used in the generation of the LIDAR data. Since the frequency of the reference signals during the feedback period matches the frequency of the LIDAR output signals during the feedback period, the portion of the LIDAR output signal shown in FIG. 2C during the feedback period represents the reference signals. The portion of LIDAR output signals output during the LIDAR data period represent the reference light signals during the LIDAR data period. As a result, the portion of the LIDAR output signal output during the LIDAR data period is labeled $RS_{LDP}$ in FIG. 2C. The portion of LIDAR output signals output during the channel period represents the reference signals during the channel period. As a result, the portion of the LIDAR output signal output during the channel period is labeled $RS_{CP}$. The comparative signal does not include the frequency offset during the LIDAR data period, the offset period, the channel period or the feedback period as is illustrated in FIG. 2C.

The LIDAR data is generated from the comparative signals (labeled $CS_{LDP}$) and the reference signals (labeled $RS_{LDP}$) that occur during the LIDAR data period but not from the comparative signals and the reference signals that occur during the output period. In contrast, the light from the portion of the LIDAR output signal(s) that are output during the LIDAR data period are not used in the generation of the LIDAR data. Additionally, the reference signals that are generated during the output period are not used in the generation of the LIDAR data. This result can be achieved by the electronics using comparative and references signals generated during the LIDAR data period to generate the LIDAR data but not using comparative and references signals generated during the output period to generate the LIDAR data.

When the LIDAR system outputs multiple LIDAR output signals that each carries a different channel, the electronics use at least the comparative and references signals generated during the channel period to identify one or more channel identifications selected from the group consisting of the comparative and references signals that carry the same channel, the channel carried by each of the comparative and references signals, the channel carried by multiple different composite signals that each carries a signal couple where the signal couple includes one of the reference signals and the comparative signal carrying the same channel, the channel that is associated with a frequency of a composite signal, and the channel that is associated with all or a portion of the LIDAR data results. Each of these channel identifications allows all or a portion of the LIDAR data from the LIDAR data period to be associated with one of the channels. As a result, different LIDAR data results can be associated with different channels. Since LIDAR output signals carrying different channels can be directed to different sample regions, the ability to associate different LIDAR data results with different channels allows different LIDAR data results to be associated with different sample regions in the field of view.

Accordingly, the light in the outgoing LIDAR signal that becomes the LIDAR output signal(s) during the channel period is used to associate the channels with different signals and/or with different LIDAR data results; however, during the output period the light in the outgoing LIDAR signal that becomes the LIDAR output signal(s) is not used in to associate the channels with different signals and/or with different LIDAR data results.

FIG. 2C shows that the frequency differential between the comparative signal and the reference signal during the LIDAR data period is equal to $\alpha*\tau-f_d$. However, the frequency differential between the comparative signal and the reference signal during the LIDAR data period is equal to $\alpha*\tau-f_d-i(df)$ where $f_d$ represents the shift in frequency due to the Doppler effect. As a result, a portion of the frequency differential is the change in the frequency offset (df), the Doppler shift in frequency, and another portion of this frequency differential is a result of the roundtrip delay, $\tau$. FIG. 2C assumes there is zero radial velocity between the LIDAR system and the reflecting object and accordingly does not show a vertical shift in the frequency in order to simplify the illustration.

The frequency offset ($fs_i$) is electronically encoded into the reference signals and the comparative signals by the electronics through use of the one or more modulators described above and/or operation of the light source 10. In contrast, the frequency differential resulting from roundtrip delay is induced by the distance between the LIDAR system and the object off which the LIDAR output signals are reflected and the Doppler shift results from radial velocity between the LIDAR system and the object.

In FIG. 2B, the rate of frequency change ($\alpha$) is shown as being the same in data period DP1 and in data period DP2. However, the rate of frequency change ($\alpha$) can be different in data period DP1 and data period DP2. Additionally or alternately, although the rate of frequency change ($\alpha$) is shown as being the same for corresponding data periods in different channels, the rate of frequency change ($\alpha$) can be different in corresponding data periods from different channels.

The data period labeled $DP_3$ in FIG. 2B is optional. The frequency of the LIDAR output signal during the output period for the data period labeled $DP_3$ in FIG. 2B can be a constant. The frequency of the LIDAR output signal during the feedback period for data period $DP_3$ can also be a constant where the difference between the frequency during the feedback period and during the output period is equal to $fs_i$. Although the frequency of the LIDAR output signal during data period $DP_3$ is shown as a constant, the frequency can also change at a rate $\alpha'$ that is different from the rate of change in the other data periods from the same cycle. For instance, when a data period $DP_3$ is used to identify corresponding frequencies as described below, the rate of frequency change during data period $DP_3$ can be different from the rates of frequency change during data period DP, and data period $DP_2$. Although FIG. 2B and FIG. 2C are disclosed using examples where the cycles have two data periods or three data periods, the cycles can one data period or more than three data periods.

The outgoing LIDAR signal and/or the channels can be modulated so as to produce a modulated outgoing LIDAR signal and accordingly, a LIDAR output signal that is a function of a sinusoid with a frequency provided by the above frequencies $f_i$. As an example, the outgoing LIDAR signal and/or the channels can be modulated so as to produce a LIDAR output signal with an electrical field magnitude that is a function of or is represented by the following Equation 5: $N+M*\cos(f_i*t+D)$ where t can represent the t or t' defined above and M, N and, D are constants where N and D can be zero or non-zero and M is not equal to zero.

One example of a LIDAR system includes a light source constructed according to FIG. 2A where the light source is configured to generate two LIDAR output signals. One of the LIDAR output signals carries a channel with a frequency versus time according to channel $\lambda_0$ of FIG. 2B and the other LIDAR output signal carries a channel with a frequency versus time according to channel $\lambda_1$ of FIG. 2B. Accordingly, the LIDAR system can be constructed according to FIG. 1A with two processing components 34. Another example of a LIDAR system includes a light source constructed according to FIG. 2A where the light source is configured to generate three LIDAR output signals. One of the LIDAR output signals carries a channel with a frequency versus time according to channel $\lambda_0$ of FIG. 2B, another LIDAR output signal carries a channel with a frequency versus time according to channel $\lambda_1$ of FIG. 2B, and another LIDAR output signal carries a channel with a frequency versus time according to channel $\lambda_2$ of FIG. 2B. Accordingly, the LIDAR system can be constructed according to FIG. 2A with three processing components 34. As is evident from these examples, the number of processing components 34 included in the LIDAR system can match the number of LIDAR output signals that each carries a different channel.

Suitable laser sources 84 for use with a light source 10 constructed according to FIG. 2A include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

The duration of the offset period can be short in order to increase the possible durations of the feedback period and/or the output period. For instance, the duration of the offset period can be 0.0 second and the frequency offset can accordingly be a step function. The duration of the offset period (FSP) can be non-zero as shown in FIG. 2C. In order to illustrate a non-zero duration for the offset period (FSP), FIG. 2C shows an offset period (FSP) duration that may be considered exaggerated relative to the output period (OP) and the feedback period (FP) for some embodiments of the LIDAR system.

In some instances, the duration of offset period (FSP) is greater than or equal to 0.0%, 0.5%, or 1% of the duration of the output period (OP) and/or less than 2%, 5%, or 10% of the duration of the output period (OP) and/or the duration of offset period (FSP) is greater than or equal to 0.0%, 0.1%, or 0.2% of the duration of the feedback period (FP) and/or less than 0.5%, 1%, or 2% of the duration of the feedback period (FP). Additionally or alternately, in some instances, the offset period (FSP) duration is greater than or equal to 0.0 µs, 0.01 µs, or 0.05 µs and/or less than 0.1 µs, 0.5 µs, 1 µs and/or the frequency change rate during the duration of the offset period (FSP) is greater than or equal to 0.1 GHz/µs, 0.5 GHz/µs, or 1 GHz/µs and/or less than 10 GHz/µs, 100 GHz/µs. The value of these variables can be application specific and many applications can use or require one or more variable values that are outside of the given ranges.

In some instances, the duration of offset period (FSP) is greater than or equal to 0.0%, 0.5%, or 1% of the duration of the output period (OP) and/or less than 2%, 5%, or 10% of the duration of the output period (OP) and/or the duration of offset period (FSP) is greater than or equal to 0.0%, 0.1%, or 0.2% of the duration of the feedback period (FP) and/or less than 0.5%, 1%, or 2% of the duration of the feedback period (FP). Additionally or alternately, in some instances, the offset period (FSP) duration is greater than or equal to 0.0 µs, 0.01 µs, or 0.05 µs and/or less than 0.1 µs, 0.5 µs, 1 µs and/or the frequency change rate during the duration of the offset period (FSP) is greater than or equal to 0.1 GHz/µs, 0.5 GHz/µs, or 1 GHz/µs and/or less than 10 GHz/µs, 100 GHz/µs. Additionally or alternately, in some instances, a ratio of the LIDAR data period duration to the channel period duration is greater than 0.25:1, 0.5:1 or 0.9:1 and/or is less than 1.1:1, 1.5:1, or 2:1XXX. Suitable LIDAR data period (LDP) durations include, but are not limited to durations greater than or equal to 0.25 µs, 0.5 µs, or 1 µs and/or less than 2 µs, 5 µs, 10 µs. Suitable channel period (CP) durations include, but are not limited to durations greater than or equal to 0.25 µs, 0.5 µs, or 1 µs and/or less than 2 µs, 5 µs, 10 µs. The value of these variables can be application specific and many applications can use or require one or more variable values that are outside of the given ranges.

Figure 3A:
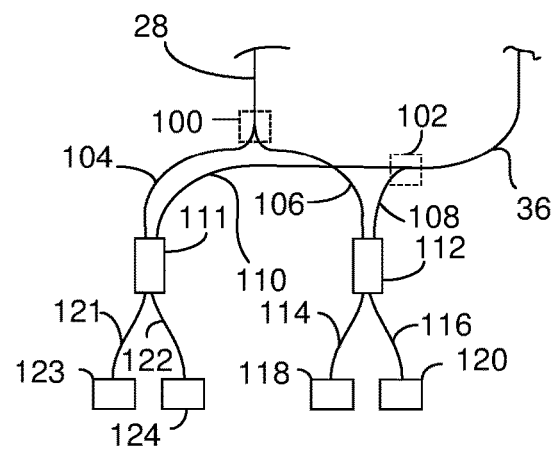
FIG. 3A through FIG. 3C illustrate an example of suitable processing component for use in the above LIDAR systems.
Figure 3B:
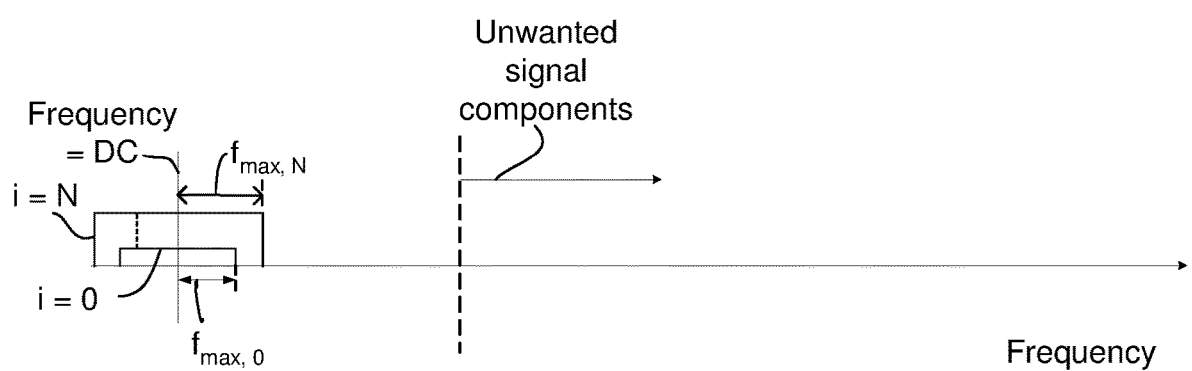

FIG. 3A through FIG. 3B illustrate an example of suitable processing components 34 for use in the LIDAR system of FIG. 1A and FIG. 1B. The processing unit includes a first splitter 102 that divides a reference signal carried on a reference signal waveguide 36 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

The processing unit includes a second splitter 100 that divides the comparative signal carried on the comparative signal waveguide 28 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 3B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 3B are included on the LIDAR chip. In some instances, the components illustrated in the schematic of FIG. 3B are distributed between the LIDAR chip and electronics located off of the LIDAR chip.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

As a result of the above channel configurations, the first data signal and the second data signal include unwanted signal components in addition to desired beat signals. However, the values of $\Delta f$ and $df$ can be selected such that $\Delta f > (N+1) \cdot df$, $\Delta f > B_1$, $\Delta f > B_2 + df$, and $\Delta f > f_{samp}$ where $N+1$ represents the number of channels for which LIDAR data is to be generated, where $B_1$ represents the frequency change during the LIDAR data period (LDP), $B_2$ represents the frequency change during the channel period (CP), and $f_{samp}$ represents sampling frequency of an Analog-to-Digital Converter (ADC) to be discussed below. Under these circumstances, the unwanted signal components the first data signal and the second data signal have a frequency above the frequency of the desired beat signals. As a result, filtering can separate the unwanted signal components from the desired beat signals.

FIG. 3B illustrates the relationship between the channels and the frequencies in the first data signal during the feedback period. The desired beat signals associated with different wavelengths appear in separate channels in the frequency domain. The channel associated with wavelength i is centered at the frequency labeled DC where DC represents the zero frequency. The maximum frequency for channel i is given by $DC + f_{max,i}$. Accordingly, the maximum frequency for the channel with the highest frequency (Channel i=N) is equal to $DC + f_{max,N}$.

Although FIG. 3B is disclosed as representing the frequencies in the first data signal, FIG. 3B can also represent the frequencies in the second data signal. Accordingly, the values of $f_{max,i}$ associated with the first data signal can be the same for the second data signal.

In some instances, the LIDAR data is generated for each of the channels by providing the first data signal to a first Analog-to-Digital Converter (ADC) and the second data signal to a second Analog-to-Digital Converter (ADC). The resulting digital signals can then be provided to a transform module configured to perform a complex transform on a complex signal so as to convert the input from the time domain to the frequency domain. The first data signal can be the real component of the complex signal and the second data signal can be the imaginary component of the complex signal. The transform module can execute the attributed functions using firmware, hardware and software or a combination thereof. The transform converts the input from the time domain to the frequency domain. Accordingly, the transform module can output one or more frequencies the each corresponds to an object in the sample region illuminated by one of the LIDAR output signals. Each of the different frequencies is used by the electronics as the frequency of one of the LIDAR input signal. The electronics can use the frequencies for further processing to determine the distance and/or radial velocity between the LIDAR system and each of the one or more reflecting objects in the sample region.

One issue with the use of Analog-to-Digital Converters (ADC) on the first data signal and/or on the second data signal may be that the ADC sampling rate required to generate useful results may be impractical to achieve. Another option is to separate the different channels in the first data signal and the second data signal before converting from analog to digital.

Figure 3C:
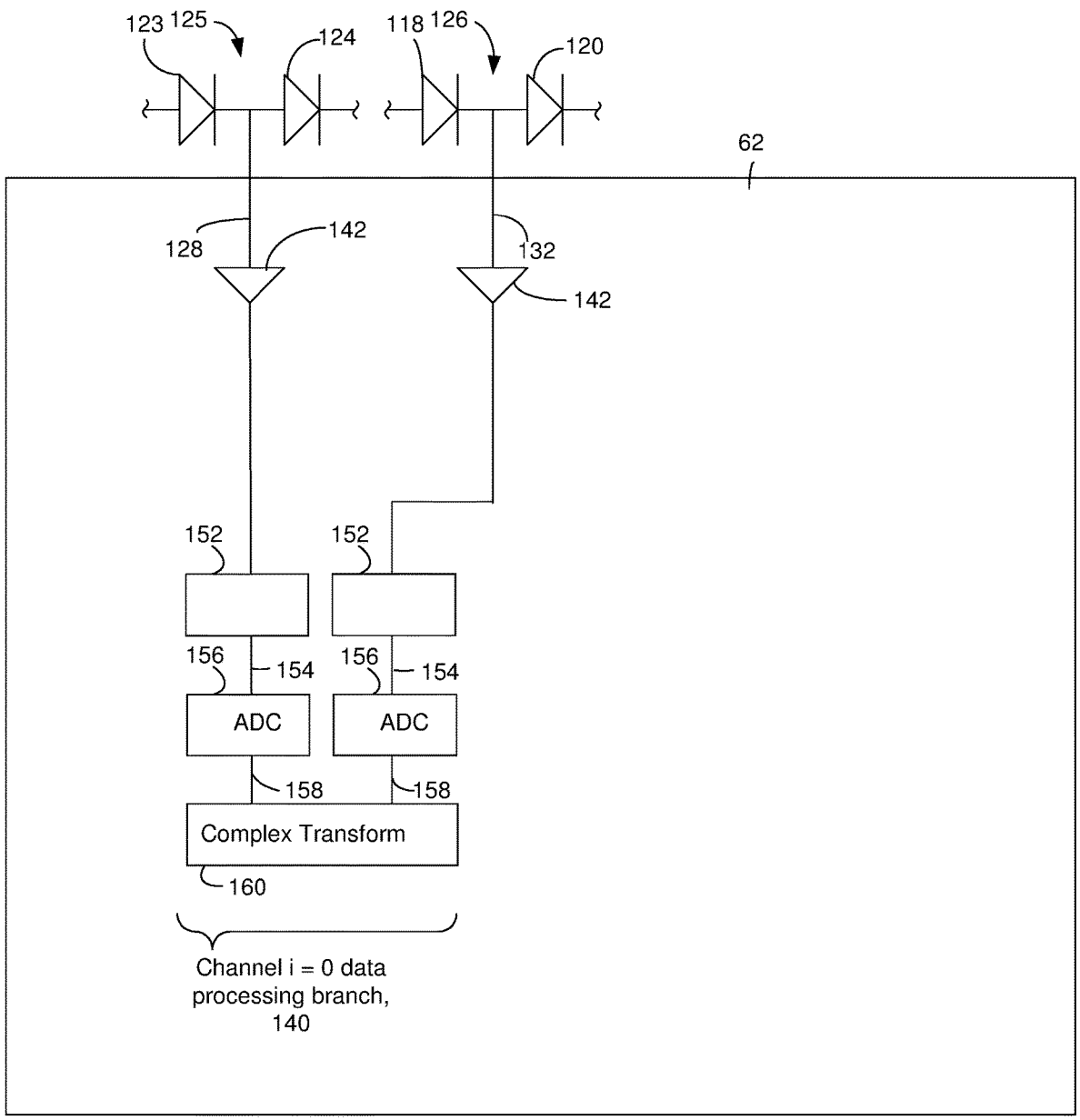

FIG. 3C illustrates a schematic for an example of electronics that are suitable for use with a processing unit constructed according to FIG. 3A. The first data line 128 can carry the first data signal to an optional amplifier 142 to amplify to the power of the first data signal to a desired power level. The second data line 138 can carry the second data signal to an optional amplifier 142 to amplify to the power of the second data signal to a desired power level.

The first data line 128 carries the first data signal to a first filter 152. In the above discussions, the desired beat frequencies are centered at the DC frequency. The first filters 152 in each data processing branches 140 are configured to pass the frequencies in a frequency band centered at the DC frequency and extending at least up to $f_{max,N}$ while filtering out higher frequencies. As a result, each first filter 152 outputs a first filtered signal that includes the desired beat frequencies but excludes the undesirable frequencies.

The second data line 132 carries the signal data signal a second filter 153. In the above discussions, the desired beat frequencies are centered at the DC frequency. The second filter 153 in each data processing branch 140 is configured to pass the frequencies in a frequency band centered at the DC frequency and extending at least up to $f_{max,N}$ while filtering out higher frequencies. As a result, each second filter 153 outputs a second filtered signal that includes the desired beat frequencies but excludes the undesired frequencies. Suitable filters for use as the first filters and/or second filters include, but are not limited to, lowpass filters because the first frequency-shifted data signals and the second frequency-shifted data signals are centered at the DC frequency.

The first filtered signals and the second filtered signals are each received on an ADC input line 154 that each carries the received signal to an Analog-to-Digital Converter 156 (ADC). According to the Nyquist sampling theorem, the sampling rate for an Analog-to-Digital Converters (ADC) is generally greater than or equal to twice the highest frequency in the signal. Accordingly, if the frequency arrangement were as shown in FIG. 3B, the sampling rate for channel i would be greater than or equal to $2*(f_{max,i})$. In FIG. 3B, the signal i would be considered oversampled when the sampling rate is greater than $2*(f_{max,i})$ and undersampled when sampling rate is less than $2*(f_{max,i})$. Accordingly, the sampling rate for each Analog-to-Digital Converter 156 can be greater than or equal to twice $2*(f_{max,i})$.

The Analog-to-Digital Converters 156 that each receives a first filtered signal outputs a first digital data signal. The Analog-to-Digital Converters 156 that each receives a first filtered signal outputs a second digital data signal. The first digital data signals and the second digital data signals are each received on a digital data line 158.

Each digital data line carries the received signal to a transform module 160. The transform modules 160 is configured to perform a complex transform on a complex signal so as to convert the input from the time domain to the frequency domain. The first digital data signal can be the real component of the complex signal and the second digital data signal can be the imaginary component of the complex signal. The transform modules can execute the attributed functions using firmware, hardware and software or a combination thereof.

The Complex Fourier transform converts the input from the time domain to the frequency domain and outputs one or more frequencies the each corresponds to an object in the sample region illuminated by one of the LIDAR output signals. Different reflecting objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system. Accordingly, the Complex Fourier transform outputs one or more frequencies that for each of the channels.

The frequency output from the Complex Fourier transform represents the beat frequency of the composite signals that each includes a comparative signal beating against a reference signal. As is evident from FIG. 2C, the frequency of the beat signal during the LIDAR data period ($\alpha*\tau-f_d$) is different from the frequency of the beat signal during the channel period ($\alpha*\tau-f_d-i(df)$). As a result, during a feedback period, the Complex Fourier transform outputs two frequencies for each object, one of them is associated with the channel period and one is associated with the LIDAR data period. Accordingly, during a feedback period, the Complex Fourier transform frequencies that are each associated with a channel and during the channel period or the LIDAR data period. The frequencies associated with channel i during the LIDAR data period can be represented by $f_{i,LDP}$ and the frequencies associated with channel i during the channel period can be represented by $f_{i,CP}$. We can see that $f_{i,LDP}=(\alpha*\tau-f_d)$ and $f_{i,CP}=(\alpha*\tau-f_d-i(df))$.

It can be difficult to determine which frequencies output from the mathematical transform are associated with which channel. However, the beat frequencies during the LIDAR data period and the channel period can be combined to identify which frequencies are associated with which channels. For instance, solving $f_{i,LDP}=(\alpha*\tau-f_d)$ and $f_{i,CP}=(\alpha*\tau-f_d-i(df))$ for i shows that $i=(f_{i,CP}-f_{i,LDP})/df$. Using this equation, a value of i can be calculated for different frequency pairs ($f_{i,LDP}$, $f_{i,CP}$) and the frequency pairs that provide a value that is closest to one one of the channel indices (i) can be identified as belonging to the calculated channel. This example of matching frequencies with channels is exemplary and other approaches can be employed to match frequencies and channels. The matching of the frequencies with channels also identifies the channels that are carried by different composite signals and/or the channels carried by different comparative signals and/or by different reference signals.

The LIDAR data period beat frequencies ($f_{i,LDP}$) from two or more different data periods can be combined to generate the LIDAR data. The LIDAR data period beat frequencies ($f_{i,LDP}$) that are combined are identified as being associated with the same channel. For instance, an $f_{1,LDP}$ determined from $DP_1$ in FIG. 2B can be combined with an $f_{1,LDP}$ determined from $DP_2$ in FIG. 2B to determine the LIDAR data. As an example, the following equation applies during a data period where electronics increase the frequency of the outgoing LIDAR signal during the data period such as occurs in data period $DP_1$ of FIG. 2B: $f_{ub}=-f_{d,i}+\alpha\tau$ where $f_{ub}$ is a frequency provided by the transform module ($f_{i,LDP}$ determined from $DP_1$ in this case), $f_{d,i}$ represents the Doppler shift ($f_{d,i}=2vf_{c,i}/c$) where v is the velocity of the reflecting object relative to the LIDAR system where the direction from the reflecting object toward the chip is assumed to be the positive direction, and c is the speed of light. The following equation applies during a sample where electronics decrease the frequency of the outgoing LIDAR signal such as occurs in data period $DP_2$ of FIG. 2B: $f_{db}=-f_{d,i}-\alpha\tau$ where $f_{db}$ is a frequency provided by the transform module ($f_{i,LDP}$ determined from $DP_2$ in this case). In these two equations, $f_{d,i}$ and $\tau$ are unknowns. The electronics solve these two equations for the two unknowns. The radial velocity for the sample region then be determined from the Doppler shift ($v_i=c*f_{d,i}/(2f_c)$) and/or the separation distance for that sample region can be determined from $c*f_{d,i}/2$. Since the LIDAR data can be generated for each of the matched frequencies output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 2B is optional. As noted above, there are situations where more than one object is present in a sample region. For instance, during the feedback period in $DP_1$ for $cycle_2$ and also during the feedback period in $DP_2$ for $cycle_2$, more than one frequency pair can be matched to the same channel. In these circumstances, it may not be clear which frequencies from $DP_2$ correspond to which frequencies from $DP_1$. As a result, it may be unclear which frequencies need to be used together to generate the LIDAR data for an object in the sample region. As a result, there can be a need to identify corresponding frequencies. The identification of corresponding frequencies can performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 2B. When there are two objects in a sample region illuminated by the LIDAR outputs signal for channel $\lambda_0$, the transform module outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: ($f_{d1}$, $f_{u1}$); ($f_{d1}$, $f_{u2}$); ($f_{d2}$, $f_{u1}$); and f ($f_{d2}$, $f_{du2}$). A value of $f_d$ and $\tau$ can be calculated for each of the possible frequency pairings. Each pair of values for $f_d$ and $\tau$ can be substituted into $f_3 = -f_d + \alpha_3 \tau_0$ to generate a theoretical $f_3$ for each of the possible frequency pairings. In this case, the transform modules 136 also outputs two values for $f_3$ that are each associated with channel $\lambda_0$ are treated as an actual $f_3$ value. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region.

Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

Figure 4:
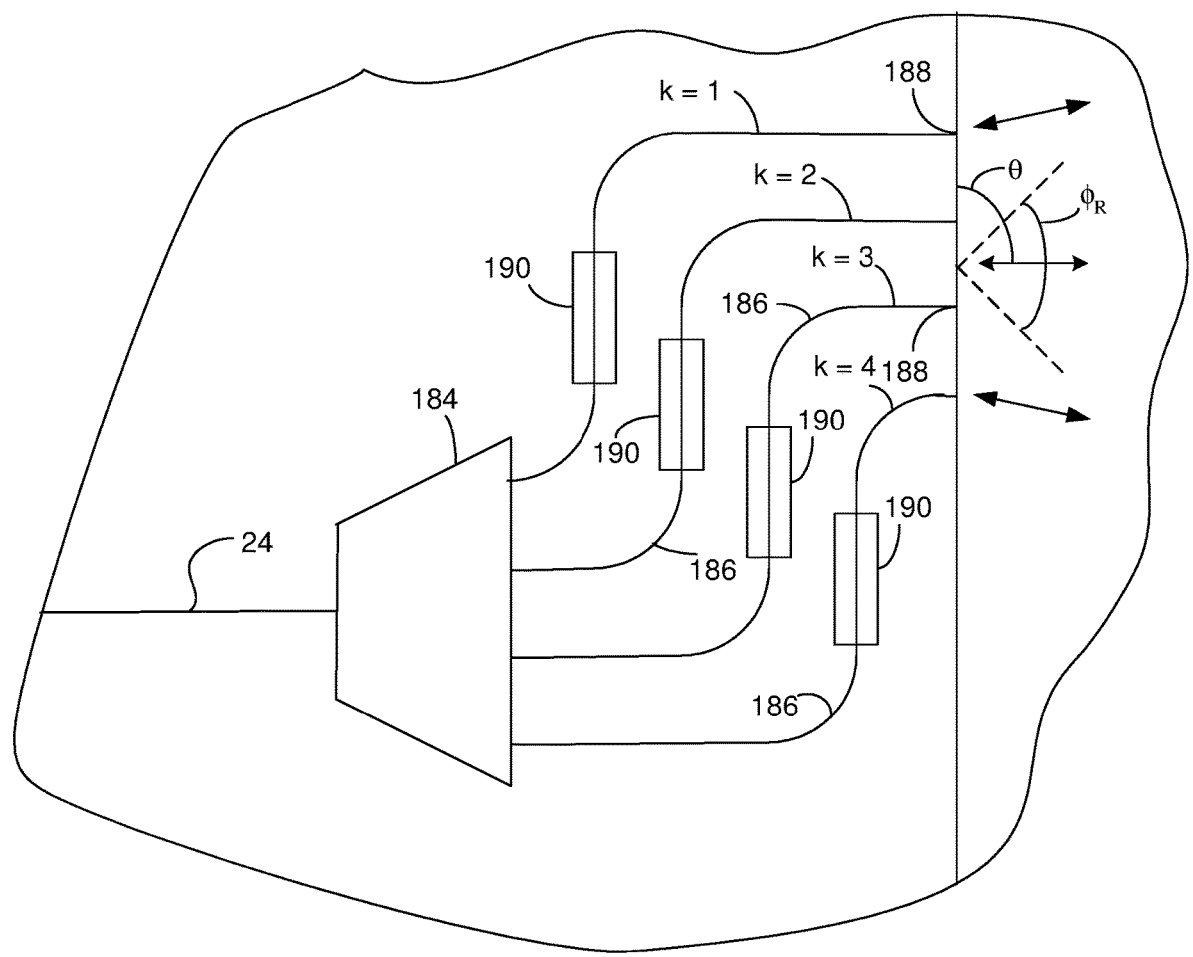
FIG. 4 illustrates an example of a demultiplexing component that includes beam steering capability.

Suitable output components 26 for use in the LIDAR system can be waveguide facets. FIG. 4 illustrates an example of a suitable output component 26 that can optionally include beam steering capability. The demultiplexing component 26 includes a splitter 184 that receives the outgoing light signal from the LIDAR signal waveguide 24. The splitter divides the outgoing light signal into multiple output signals that are each carried on a steering waveguide 186. Each of the steering waveguides ends at a facet 188. The facets are arranged such that the output signals exiting the chip through the facets combine to form the LIDAR output signal.

The splitter and steering waveguides can be constructed such that there is not a phase differential between output signals at the facet of adjacent steering waveguides. For instance, the splitter can be constructed such that each of the output signals is in-phase upon exiting from the splitter and the steering waveguides can each have the same length. Alternately, the splitter and steering waveguides can be constructed such that there is a linearly increasing phase differential between output signals at the facet of adjacent steering waveguides. For instance, the steering waveguides can be constructed such that the phase of steering waveguide number k is $f_o' + (k-1)f'$ where k is an integer from 1 to K and represents the number associated with a steering waveguide when the steering waveguides are sequentially numbered as shown in FIG. 4, f' is the phase differential between neighboring steering waveguides when the phase tuners (discussed below) do not affect the phase differential, and $f_o'$ is the phase of the output signal at the facet of steering waveguide k=1. Because the channels can have different wavelengths, the values of f' and $f_o'$ can each be associated with one of the channels. In some instances, this phase differential is achieved by constructing the steering waveguides such that the steering waveguides have a linearly increasing length differential. For instance, the length of steering waveguide k can be represented by $L_o + (k-1)\Delta l$ where $\Delta l$ is the length differential between neighboring steering waveguide, and $L_o$ is the length of steering waveguide k=1. Because $\Delta l$ is a different percent of the wavelength of different channels included in the outgoing LIDAR signal, each of the different LIDAR output signals travels away from LIDAR chip in a different direction ($\theta$). When the steering waveguides are the same length, the value of $\Delta l$ is zero and the value of f' is zero. Suitable $\Delta l$ include, but are not limited to, $\Delta l$ greater than 0, or 5 and/or less than 10, or 15 μm. Suitable f' include, but are not limited to, f greater than 0π, or 7π and/or less than 15π, or 20π. Suitable K include, but are not limited to, K greater than 10, or 500 and/or less than 1000, or 2000. Suitable splitters include, but are not limited to, star couplers, cascaded Y-junctions and cascaded 1×2 MMI couplers.

A phase tuner 190 can be positioned along at least a portion of the steering waveguides. Although a phase tuner is shown positioned along the first and last steering waveguide, these phase tuners are optional. For instance, the chip need not include a phase tuner on steering waveguide k=1.

The electronics can be configured to operate the phase tuners so as to create a phase differential between the output signals at the facet of adjacent steering waveguides. The electronics can operate the phase tuners such that the phase differential is constant in that it increases linearly across the steering waveguides. For instance, electronics can operate the phase tuners such that the tuner-induced phase of steering waveguide number k is $(k-1)\omega$ where $\omega$ is the tuner-induced phase differential between neighboring steering waveguides. Accordingly, the phase of steering waveguide number k is $f_o' + (k-1)f' + (k-1)\omega$. FIG. 4 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners so as to tune the value of the phase differential $\omega$. Tuning the value of the phase differential $\omega$ changes the direction that the LIDAR output signal travels away from the chip ($\theta$). Accordingly, the electronics can scan the LIDAR output signal by changing the phase differential $\omega$. The range of angles over which the LIDAR output signal can be scanned is $\phi_R$ and, in some instances, extends from $\phi_v$ to $-\phi_v$ with $\phi=0°$ being measured in the direction of the LIDAR output signal when $\omega=0$. When the value of $\Delta l$ is not zero, the length differential causes diffraction such that light of different wavelengths travels away from chip in different directions ($\theta$). Accordingly, there may be some spreading of the outgoing LIDAR signal as it travels away from the chip. Further, changing the level of diffraction changes the angle at which the outgoing LIDAR signal travels away from the chip when $\omega=0°$. However, providing the steering waveguides with a length differential ($\Delta l \neq 0$) can simplify the layout of the steering waveguides on the chip.

Additional details about the construction and operation of a demultiplexing component 26 constructed according to FIG. 4 can be found in U.S. Provisional Patent Application Ser. No. 62/680,787, filed on Jun. 5, 2018, and incorporated herein in its entirety.

The above disclosure uses channel assignments that start channel i=0 through channel N for a total of N+1 channels. However, the channel indices can be shifted. For instance, the channel index can be configured such that the channels start at channel j=1 through channel M for a total of M channels. Such a shift can be performed by substituting i=j−1 into the above equations.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
   a LIDAR system configured to generate an outgoing LIDAR signal and multiple composite light signals that each carries a different channel and that each includes a contribution from a reference signal and a contribution from a comparative signal,
      the comparative signals each including light from the outgoing LIDAR signal that has been reflected by one or more objects located outside of the LIDAR system, and
      the reference signals each including light from the outgoing LIDAR signal but excluding light that has been reflected by any object located outside of the LIDAR system; and
   electronics configured to induce a frequency offset in the reference signals between a LIDAR data period and a channel period,
      the electronics configured to use the composite signals generated during the LIDAR data period to generate LIDAR data, and
      the electronics configured to use the composite signals generated during the channel period to associate each one of at least a portion of the composite signals with the channel carried by the composite signal.

2. The system of claim 1, wherein the electronics do not induce the frequency offset in the comparative signals between the LIDAR data period and the channel period.

3. The system of claim 2, wherein the LIDAR system is configured to output multiple LIDAR output signals that each carries a different one of the channels and each includes light from the outgoing LIDAR signal,
   the LIDAR system being configured to receive multiple LIDAR input signals, each of the LIDAR input signals including light from one of the LIDAR output signals after reflection of each LIDAR output signal by an object located outside of the LIDAR system, and
   the frequency offset not being evident in the LIDAR input signals that return to the LIDAR system until after the channel period and after the LIDAR data period.

4. The system of claim 1, wherein the electronics are configured to use the composite signals generated during the channel period and during the LIDAR data period to associate each one of at least a portion of the composite signals with the channel carried by the composite signal.

5. The system of claim 4, wherein associating each one of the portion of the composite signals with the channel carried by the composite signal includes matching each one of at least a portion of the composite signals generated during the LIDAR data period with one of the composite signals generated during the channel period and carrying the same channel as the composite signals generated during the LIDAR data period.

6. The LIDAR system of claim 1, wherein the LIDAR data period and the channel period are each included in multiple data periods and the electronics are configured to generate the LIDAR data from multiple different composite signals from different data periods but carrying the same channel.

7. The LIDAR system of claim 1, wherein the LIDAR data period and the channel period follow an output period and the reference signals that are generated during the output period are not used in the generation of the LIDAR data.

8. The LIDAR system of claim 1, wherein the LIDAR data period and the channel period follow an output period and the reference signals are not generated during the output period.

9. A method of operating a LIDAR system, comprising: generating an outgoing LIDAR signal and multiple composite light signals that each carries a different channel and includes a contribution from a reference signal and a contribution from a comparative signal, the comparative signals each including light from the outgoing LIDAR signal that has been reflected by one or more objects located outside of the LIDAR system, and the reference signals each including light from the outgoing LIDAR signal but excluding light that has been reflected by any object located outside of the LIDAR system; and inducing a frequency offset in the reference signals between a LIDAR data period and a channel period; using the composite signals generated during the LIDAR data period to generate LIDAR data; and using the composite signals generated during the channel period to associate each one of at least a portion of the composite signals with the channel carried by the composite signal.

* * * * *